May 6, 1941.  N. S. FOCHT  2,240,644
HYDRAULIC SHOCK ABSORBER
Filed Jan. 28, 1939  2 Sheets-Sheet 1
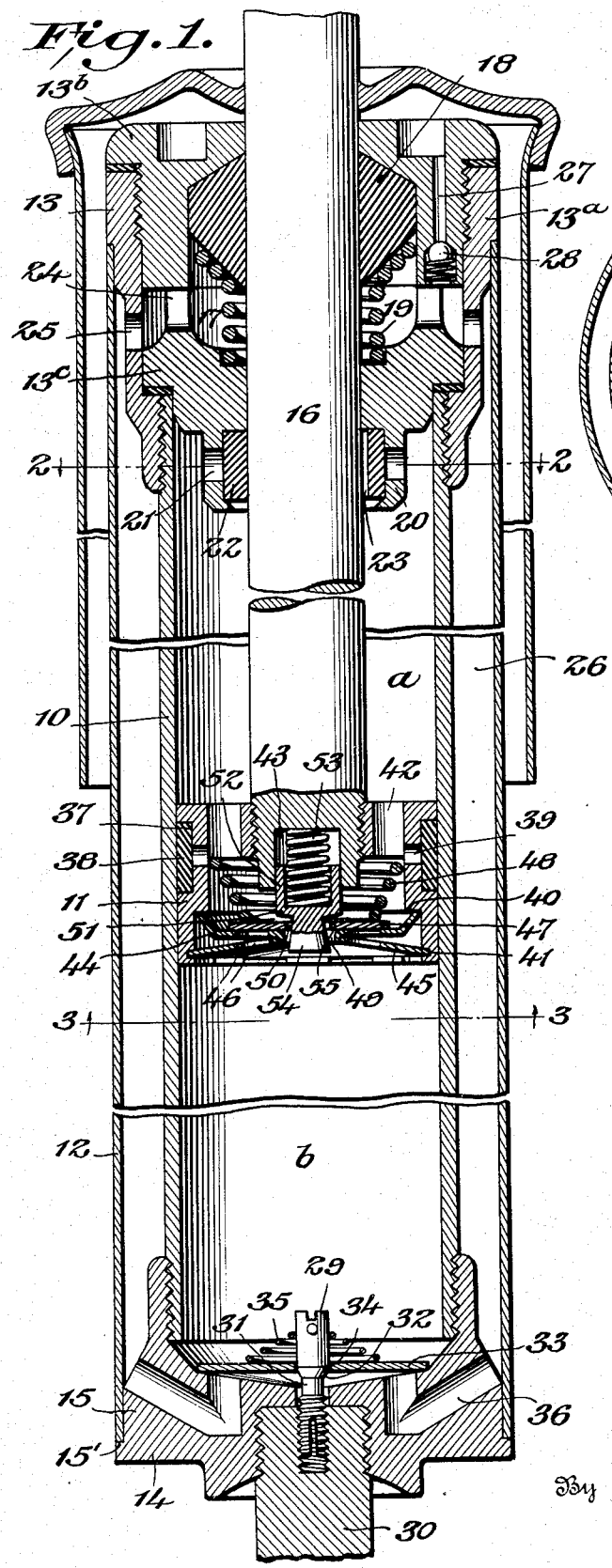
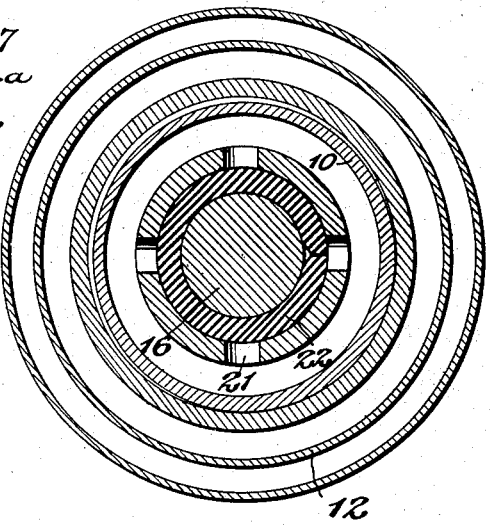
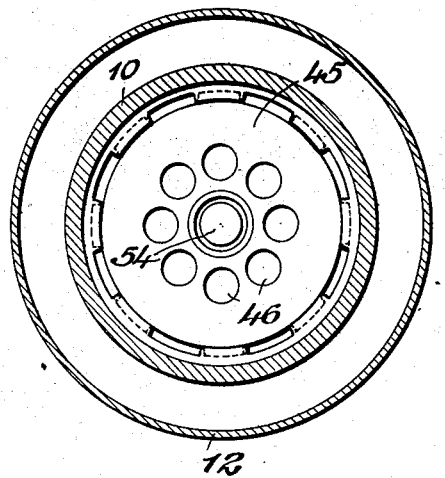
Inventor
Nevin S. Focht,
By D. P. Wolhaupter
Attorney

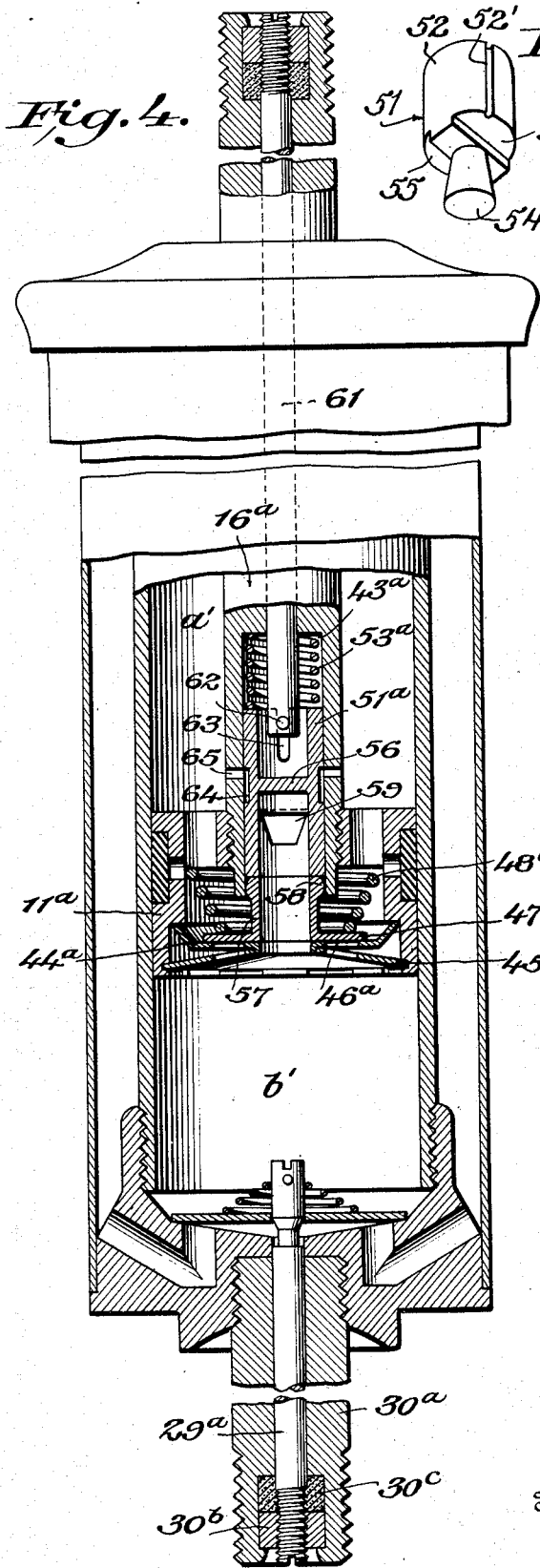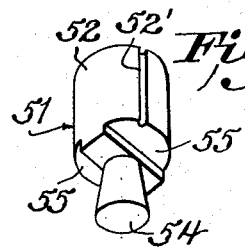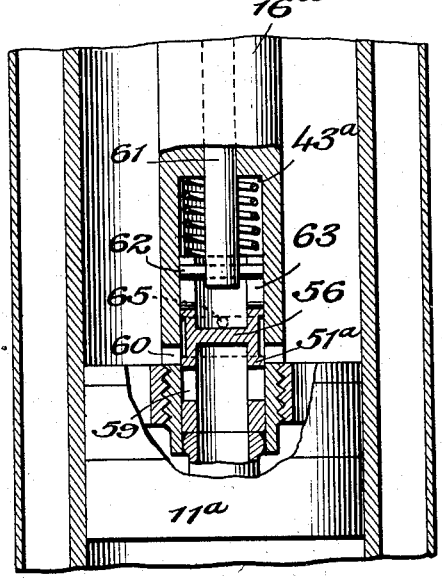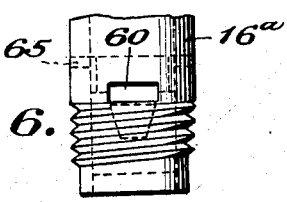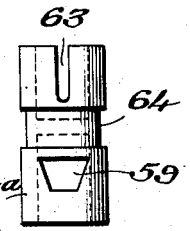

Patented May 6, 1941

2,240,644

UNITED STATES PATENT OFFICE 2,240,644

HYDRAULIC SHOCK ABSORBER

Nevin S. Focht, East Cleveland, Ohio

Application January 28, 1939, Serial No. 253,421

11 Claims. (Cl. 188—88)

This invention relates to shock absorbers of the strut type as described and claimed, for example, in my prior Patents Nos. 2,035,954, 2,036,623, and 2,144,583, and has generally in view to provide, in a shock absorber of the general type disclosed in said patents, various improved features of construction, combination, arrangement and mode of operation of the parts thereof, all contributing to a shock absorber which is of comparatively low production and maintenance cost and which is exceptionally effective in all shocks to which it may be subjected.

A special object of the invention is to provide a novel valve for controlling flow of liquid between the liquid reservoir and the compression chamber of a shock absorber of the type mentioned.

Another special object of the invention is to provide novel means for adjustment of the liquid metering valve elements of a shock absorber of the type mentioned from the outside of the shock absorber and without, in any way, disturbing the assembled relationship of the parts thereof, whereby the shock absorber may quickly and easily be adapted to operate most efficiently in connection with any given spring with which it may be associated.

Another object of the invention is to provide, in a shock absorber of the type mentioned, novel liquid metering valves which are specially suited for adjustment from the outside of the shock absorber by adjusting means provided in accordance with the invention.

Another object of the invention is to provide, in connection with the piston of a shock absorber of the type mentioned, novel packing means which effectively prevents passage of liquid from one side to the other of the piston between the same and the wall of the cylinder in which it reciprocates, and which avoids any necessity of a machined fit between the piston and the wall of the cylinder.

Another object of the invention is to provide novel means to permit the escape of air, and to prevent the escape of liquid, from the rebound chamber of a shock absorber of the type mentioned, and to provide a construction whereby air which escapes from the rebound chamber is delivered to the liquid reservoir of the shock absorber where it is of advantage in the operation of the shock absorber.

Another object of the invention is to provide means for the supply of air to, and to prevent the escape to the atmosphere of air and liquid from, the liquid reservoir of a shock absorber of the type mentioned.

Another object of the invention is to provide a novel sealing means to prevent the escape of air and liquid from the shock absorber through the opening in the head of the shock absorber through which the piston rod extends.

With the foregoing and other objects in view, which will become more fully apparent as the nature of the invention is better understood, the same consists in the novel features of construction, combinations and arrangements of parts as will be hereinafter more fully described, illustrated in the accompanying drawings and defined in the appended claims.

In the accompanying drawings, wherein like characters of reference denote corresponding parts in the different views:

Figure 1 is a central, longitudinal section through a shock absorber of the strut type embodying certain of the improvements comprising the invention.

Figure 2 is a section on the line 2—2 of Fig. 1.

Figure 3 is a section on the line 3—3 of Fig. 1.

Figure 4 is a view similar to Fig. 1 illustrating an alternative embodiment of the invention.

Figure 5 is a view similar to Fig. 4, but at right angles thereto.

Figure 6 is an elevation of the lower part of the piston rod.

Figure 7 is an elevation of the metering valve forming part of the Fig. 4 embodiment of the invention, and Figure 8 is a perspective view of the metering pin element of the Figs. 1 to 3 embodiment of the invention.

Referring to the drawings in detail, it will be observed that the present shock absorber is of the strut type illustrated in my aforesaid patents, and that the same includes a working cylinder 10 and a piston 11 for connection, respectively, with any desired pair of relatively movable elements, such, for example, as the axle and the chassis of a motor vehicle.

While the present shock absorber may be disposed for operation either vertically or horizontally or any desired inclination, it will be assumed, for purposes of simplifying the present description, that it is disposed vertically.

Concentric with and surrounding the cylinder 10 in spaced relationship thereto is a tube 12, and closing the upper and lower ends of said cylinder and tube and holding them in their spaced relationship are upper and lower heads 13 and 14, respectively.

The lower head 14 is of one-piece construction and is threaded onto the lower end of the cylinder 10 and includes an annular portion 15 snugly fitting into the lower end portion of the tube 12, whereby said tube is held spaced at its lower end from the cylinder 10. Also, said head 14 includes a shoulder 15' against which the lower end of the tube 12 seats, whereby said tube is held against downward movement relative to said head 14 and the cylinder 10. On the other hand, the upper head 13 is of three-piece construction to facilitate the embodiment therein of sealing means for the piston rod 16 which extends therethrough, and comprises an outer section 13ª and upper and lower inner sections 13ᵇ and 13ᶜ, respectively. As in the case of the lower head 14, the outer section 13ª of the upper head 13 includes an annular portion snugly fitting into the upper end portion of the tube 12 and a shoulder against which the upper end of said tube 12 seats. Thus, by screwing the lower head 14 and the section 13ª of the upper head 13 tightly onto the lower and the upper ends of the cylinder 10, the tube 12 is tightly clamped between said head 14 and said section 13ª in surrounding, spaced relationship to said cylinder. The lower, inner section 13ᶜ seats upon the upper end of the cylinder 10, or upon an interposed gasket, and is held seated, in closing relationship to the upper end of said cylinder, by the upper, inner section 13ᵇ which is threaded into the section 13ª.

The section 13ᵇ, 13ᶜ have alined, central bores through which the piston rod 16 extends. Also, said sections are counterbored at their lower and upper ends, respectively, to provide a chamber 17 in which is disposed a sealing means for the piston rod 6 comprising a suitable packing 18 in the top of said chamber surrounding said piston rod and a coil spring 19 disposed beneath said packing and exerting constant upward pressure thereagainst. The spring 19 seats at its bottom on the section 13ᶜ and the packing 18 is held against upward movement by the top portion of the section 13ᵇ. In addition, the bottom portion of the packing 18 is tapered downwardly and inwardly and the upper portion of the spring 19 is flared and embraces the said tapered bottom portion of said packing. Thus, said spring acts not only to compress said packing 18 and thereby to cause it to hug the piston rod 16, but to urge the lower, tapered end portion of said packing directly inwardly into sealing engagement with the piston rod. A particularly effective seal thus is provided preventing the escape of liquid from the shock absorber through the piston rod bore in the section 13ᵇ.

Depending from the lower section 13ᶜ is an annular flange 20 which surrounds the piston rod 16 in spaced relationship thereto and which is provided with a plurality of openings 21. Within and closely fitting this flange and surrounding the piston rod 16 and closely fitting the latter, is a gasket 22 of synthetic rubber or other suitable soft and yieldable material which is unaffected by the oil or other liquid with which the shock absorber is charged and which is provided in its inner face with a V-shaped channel 23 extending from end to end thereof. When the piston 11 rises and liquid contained in the cylinder 10 above the piston is placed under pressure, the liquid acts upon the exposed bottom of the gasket 22 to urge it upwardly against a suitable stop wall, and also through the openings 21 against the outer side of said gasket to press it against the piston rod 16, so that the only means of escape for air and liquid from the top of the cylinder is through the channel 23. The piston rod closely fits the bore in the section 13ᶜ so that little or no liquid can pass through said bore, but since air will pass where the oil or other liquid with which the shock absorber is charged will not pass, any air contained in the upper end of the cylinder will escape into the chamber 17, from whence it is free to pass through openings 24 and 25 in the sides of the sections 13ᶜ and 13ᵇ, respectively, into the upper end of the liquid reservoir 26 comprised by the space between the cylinder 10 and the tube 12. As pressure within the top of the cylinder 10 and against the gasket 22 increases, the V-channel 23 is gradually closed and becomes completely closed when the pressure reaches a predetermined value. Thus, the escape of air and any escape of liquid from the top of the cylinder is regulated in accordance with the cylinder pressure. The result is that any high velocity flow of liquid through the bore in the section 13ᶜ, and consequently, any atomization of the liquid which might result from high velocity flow, is prevented, so that any small amount of liquid which may escape from the cylinder is not aerated. Moreover, any liquid that may escape drains into the reservoir 26 through the openings 24 and 25 and any air that escapes passes through said openings into the reservoir above the level of the liquid therein, where it is utilized advantageously in the operation of the shock absorber as will later appear.

Due to the seal afforded by the gasket 22, the chamber 17 is subjected to very little pressure. Therefore, there is little or no tendency for liquid which may escape into said chamber being forced therefrom through the piston rod packing 18. Moreover, it will be noted that the bottom portion of the chamber 17, comprised by the counterbored top portion of the section 13ᶜ, is disposed below the bottoms of the openings 24. Consequently, there always is contained in the bottom portion of the chamber 17 a small body of liquid which serves to lubricate the piston rod 16 and to prevent air from passing from said chamber into the upper end of the cylinder 10.

In the section 13ᵇ is a duct 27 which affords communication between the reservoir and the atmosphere. At the inner end of this duct is an inwardly opening, spring closed check valve 28. Accordingly, air and liquid are prevented from escaping to the atmosphere from the reservoir, but when, during operation of the shock absorber, liquid is drawn from the reservoir and a subatmospheric pressure is created therein, the valve 28 opens, admitting air to the reservoir and relieving such pressure, so that the liquid is free to flow, whenever required, from the reservoir to the working chambers of the shock absorber.

In the lower head 14 is a very simple metering pin and valve combination controlling flow of liquid from the reservoir into the lower end of the cylinder 10 and from the lower end of said cylinder into said reservoir. The metering pin, designated as 29, may be threaded directly into the head 14 or into any element which is fixed with respect to said head. For example, according to the Fig. 1 embodiment of the invention, a rod 30 is shown as being threaded into the head 14 and as extending downwardly from said head for attachment of the lower end of the shock absorber to an axle or the like, and the metering pin 29 is shown as being threaded into the upper end of said rod which, to all intents and purposes may be considered part of said head 14. On the other hand, according to the Fig. 4 embodiment of the invention, the metering pin 29a is shown as extending through an axial bore in the rod 30a and as being threaded into a nut or the like 30b which is carried by said rod 30a and which retains packing 30c around the lower end portion of said metering pin which, at its lower end, is exposed at the bottom of the rod 30a. In any event, said metering pin 29 or 29a, as the case may be, extends above the upper face of the head 14 and, directly above said face, has a portion 31 of reduced diameter which is joined with the portion of larger diameter thereabove by an upwardly flaring portion 32. The valve, designated as 33, is in the form of a normally flat disk of spring steel or other suitable flexible material and has a central opening 34 in which the metering pin 29 is disposed, whereby the valve is guided by said metering pin for vertical movement.

When the valve 33 is closed it seats at its lower, peripheral edge against the upper face of the head 14, and said valve is urged constantly downward toward its seat by a suitable spring, such, for example, as a coil spring 35 interposed between said valve and a cross pin or other suitable abutment carried by the metering pin 29.

The upper face of the head 14 is inclined downwardly and inwardly toward the metering pin 29 from the circular line where the valve disk 33 seats against said face. Thus, when the valve disk 33 is seated and is in its normally flat or substantially flat condition, there exists beneath same a space of increasing cross sectional area toward the metering pin 29 into which space the central portion of said valve disk may be flexed downwardly.

In the head 14 are ducts 36 which open through the upper face of said head inwardly of and adjacent to the circular line where the valve disk 33 seats thereagainst and which afford communication between the reservoir 26 and the lower end portion of the cylinder 10 under the control of said valve disk 33 and the metering pin 29.

When the piston 11 moves upwardly in the cylinder 10 and a predetermined negative pressure thereby is created in the lower end portion of said cylinder, the valve 33 opens upwardly against the spring 35 and permits liquid to flow from the reservoir 26 through the ducts 36 into the lower end portion of the cylinder. On the other hand, when the piston 11 moves downwardly in the cylinder 10 and a predetermined positive pressure thereby is created in the lower portion of said cylinder, the valve disk 33 is centrally flexed downwardly until the flaring portion 32 or the reduced diameter portion 31 of the metering pin 29 is disposed in the opening 34 in said valve disk, whereupon liquid flows from the bottom of the cylinder 10 through the opening 34 into the space beneath the valve disk and from said space through the ducts 36 into the reservoir 26.

It will be noted that the upper portion of the metering pin 29 is of a diameter substantially corresponding to the diameter of the opening 34 in the valve disk 33 and that said upper portion of said metering pin is disposed in said opening when the valve disk is closed and is in its normally flat condition; also, that when said valve disk is closed and is in its normally flat condition, the top of the flaring portion 32 of the metering pin 29 is disposed approximately in the plane of the valve disk 33. Therefore, normally, the opening 34 is closed against flow of liquid therethrough, and is opened for flow of liquid therethrough by downward flexure of the central portion of the valve disk. Moreover, it is apparent that, due to the flared and reduced diameter portions 32, 31 of the metering pin 29, opening of the opening 34 progressively increases with increase in the downward flexure of the central portion of the valve disk 33 until the reduced diameter portion 31 of the metering pin 29 is disposed in said opening 34, so that the flow of liquid from the bottom of the cylinder 10 is proportional to the pressure created therein. Also, it is apparent that as the central portion of the valve disk 33 is flexed downwardly, its marginal portion progressively covers the tops of the ducts 36 and thereby progressively restricts flow of liquid through said ducts. Furthermore, it is apparent that progressive downward flexure of the valve disk 33 occurs only with progressive increase in pressure within the bottom portion of the cylinder 10, and that the pressure under which the valve disk will be flexed to permit flow of liquid through the opening 34 may be predetermined by adjustment of the metering pin 29. Therefore, assuming use of the shock absorber between the axle and the body of a motor vehicle in which the body is supported upon the axle through a spring, it is apparent that much desired "bottoming" control of the vehicle spring is attained. In other words, at a certain point of downward flexure of the valve disk 33, the opening 34 is of maximum effective area and the ducts 36 are sufficiently uncovered to permit all liquid which flows through said opening 34 to pass freely into the reservoir 26, but upon any further downward flexure of said valve disk, the same acts to throttle the flow through said ducts. The said certain point of downward flexure of the valve disk results from pressure developed in the bottom portion of the cylinder 10 by oscillations of the vehicle spring up to, for example, a magnitude of two inches. Accordingly, within a two inch magnitude of oscillation of the vehicle spring, or within any other magnitude of oscillation of the vehicle spring as may be predetermined by adjustment of the metering pin 29, the shock absorber is effective to control compressions of said spring smoothly and correctly. Moreover, due to the additional amount of liquid attempting to flow through the opening as a result of oscillations of the vehicle spring of more than, for example, a magnitude of two inches, there results an increase in pressure in the lower end of the cylinder 10 and further downward flexure of the valve disk 33 and throttling of the ducts 36 until a lesser amount of liquid is permitted to flow therethrough than through the opening 34. Downward movement of the piston 11 thus is smoothly checked and "bottoming" of the vehicle spring thereby is prevented. In this connection it is apparent that since liquid must be displaced below the valve disk 33 under every downward flexure of said disk by cylinder pressure thereabove, fluttering of said valve disk is prevented and its smooth operation is assured.

Adjustment of the metering pin 29 or 29a to predetermine the pressure under which resulting flexure of the valve disk 33 will permit flow of liquid through the opening 34 is, of course, effected by rotation of the metering pin, due to its threaded connection either directly or indirectly with the head 14, and in this connection it will be noted that the Fig. 4 form of the invention provides for adjustment of said metering pin at will without disassembling the shock absorber in any way, inasmuch as the lower end of the metering pin is exposed at the lower end of the rod 30ᵃ; whereas, according to the Fig. 1 form of the invention, it is necessary to remove the head 14 in order to obtain access to the metering pin for purposes of adjusting the same. Either arrangement may be used and once a proper adjustment of the metering pin has been effected in any given instance, both arrangements operate identically. Obviously, however, the Fig. 4 arrangement greatly facilitates obtaining desired adjustments of the metering pin.

According to both forms of the invention the piston 11 is provided exteriorly with an annular channel 37 in which is disposed a packing ring 38 of synthetic rubber or other soft and yieldable material which is unaffected by the oil or other liquid with which the shock absorber is charged and which is exposed at its inner side through openings 39 in the wall of the piston to the pressure of said liquid. Accordingly, the liquid, under pressure, acting outwardly against said packing ring assures liquid-tight engagement of the same with the wall of the cylinder 10 even though the bore of said cylinder may not be truly circular and even though the piston 11 does not truly fit said bore. Thus, neither the cylinder 10 nor the piston 11 is required to be machined and the cylinder 10 may, therefore, be comprised simply by a section of seamed tubing, which obviously is important from the standpoint of economically producing the shock absorber. Of course, any other packing means for the piston 11 may be employed if desired.

According to the Fig. 1 embodiment of the invention a valve arrangement operating similarly to the piston-carried valve arrangement of my prior Patent No. 2,144,583, but comparatively of simplified construction and embodying a novel safety feature, is provided. The piston 11 has a top wall into which is threaded the lower end of the piston rod 16, and below said top wall the piston is hollow and is counterbored from its bottom to provide an annular downwardly facing shoulder 40. Moreover, at a point suitably spaced below the shoulder 40, the counterbored bottom portion of the piston is provided with an annular, inwardly opening groove 41. In the top wall of the piston are openings 42 which afford communication between the cylinder space above said piston and the hollow, bottom portion of the latter, and, as shown, the piston rod 16 extends through the piston top wall and is provided with an axial bore 43 which opens through its bottom into the hollow, bottom portion of the piston.

A dish-like valve seat 44 pressed from a disk of sheet steel or otherwise suitably formed from any other suitable material, is seated at its upper, marginal edge against the shoulder 40 and is maintained normally seated thereagainst by a suitable spring which, in the present instance, is in the form of an upwardly dished disk 45 of spring steel or other suitable material peripherally engaged in the groove 41 and having its central portion bearing upwardly against the central portion of said valve seat disk 44.

In the valve seat disk 44 and the spring disk 45 are openings 46 through which communication is afforded between the cylinder spaces above and below the piston 11 under the control of a valve disk 47 which normally is maintained seated against the upper face of the disk 44, in covering relationship to the openings 46 therein, by a coil spring 48 interposed between said valve disk and the top wall of the piston.

In the valve seat disk 44 is a central opening 49 around which the metal of said disk is turned downwardly through a central opening in the spring disk 45. The disks 44 and 45 thus are held alined and communication also is afforded between the cylinder spaces above and below the piston 11 through said opening 49 and through a central opening 50 in the valve disk 47 under the control of a liquid metering pin element 51 comprising a hollow, cylindrical body portion 52 of open-top, closed-bottom form which is slidably mounted in the bore 43 of the piston rod 16 and which is constantly urged downwardly against the valve disk 47, in closing relationship to the central opening 50 therein and maintaining said valve disk normally seated against the valve seat 44, by a coil spring 53, interposed between said metering pin body portion 52 and the wall defining the top of said bore 43. Depending from the lower end of the metering pin body 52 through the central opening 50 in the valve disk 47 and through the opening 49 in the valve seat disk 44, is a metering pin 54 which is of downwardly flaring form and which is of suitably lesser diameter at its lower end than the opening 49, so that when its lower end is disposed within said opening a predetermined small amount of liquid may flow through said opening.

The body portion 52 of the metering pin element 51 is made of suitably smaller cross-sectional area than the bore 43, in any suitable manner, as for example by being longitudinally grooved as indicated at 52' in Fig. 8 of the drawings, for flow of liquid between said bore above the metering pin body portion 52 and the hollow portion of the piston 11 above the valve seat disk 44. Moreover, the metering pin body 52 is notched at opposite sides, as indicated at 55, so that when the metering pin element and the valve disk 47 are in their normal positions shown in Fig. 1, liquid may flow through the opening 50.

Assuming that the piston rod 16 is connected at its upper end with the chassis of a motor vehicle; that the rod 30 is connected at its lower end to the axle of such vehicle; that the chassis is supported upon the axle through a leaf spring which is under normal load; that the piston is in a normal position approximately midway between the ends of the cylinder 10; that the valve disks 33 and 47 are in their normally closed positions; that the metering pin element 51 is in its lowermost position, and that the shock absorber is charged with oil or other suitable liquid, the same has four distinct phases of operation; viz., (1) compression above normal, as when an obstruction in a roadway is encountered and the vehicle spring is compressed with consequent relative upward and downward movement of the cylinder 10 and the piston 11, respectively; (2) rebound above normal, or relative downward and upward movement of the cylinder 10 and the piston 11, respectively, from their "compression above normal" status; (3) rebound below normal, as when a depression in a roadway is encountered and the vehicle spring is deflected with consequent relative movement of the cylinder 10 and the piston 11 downwardly and upwardly, respectively, from their normal relative position; and (4) compression below normal, or relative upward and downward movement of the cylinder 10 and the piston 11, respectively, from their "rebound below normal" status.

As "compression above normal" occurs the piston 11 and the head 14 move toward each other and the liquid in the cylinder 10 below the piston 11 is subjected to pressure. The valve 33 being closed, flow of liquid from the compression chamber b, comprised by the cylinder space between the piston 11 and the head 14, to the reservoir 26 is prevented, unless, of course, the pressure developed becomes so high as to flex said valve 33 downwardly, in which event liquid flows to the reservoir 26 through the opening 34 and the ducts 36 under the control of the metering pin 29 and the valve disk 33, with the result that "bottoming" of the vehicle spring is prevented as heretofore described. In any event, all of the liquid that is displaced by movement of the piston 11 and the head 14 toward each other cannot escape through the opening 34 nor through the opening 50 in the valve disk 47. Therefore, the valve disk 47 rises and liquid flows from the chamber b through the openings 46 in the valve seat disk 44 and the spring disk 45 and through the piston 11 into the rebound chamber a comprised by the cylinder space between the piston 11 and the head 13, at a rate determined by the strength of the spring 48, the areas of the openings 46 and the resistance to upward movement of the valve disk 47 offered by the spring 53 which constantly urges the metering pin element 51 downwardly against said valve disk 47. The control in this respect is such as to permit the piston 11 and the head 14 to approach each other at the desired rate. Accordingly, during "compression above normal" phases of operation of the shock absorber, movement of the chassis and the axle of the vehicle toward each other are properly checked.

Due to the presence of the piston rod 16 in the rebound chamber a, this chamber cannot accommodate all of the liquid that is forced from the compression chamber b. The excess liquid therefore flows to the reservoir 26 via the opening 34 in the valve disk 33 and the ducts 36.

As the "rebound above normal" phase of operation occurs, the piston 11, in its return to its normal position, moves toward the head 13, thereby subjecting the liquid in the rebound chamber a to pressure. Obviously, the only avenue of escape for the liquid from said chamber a is through the piston 11 to the chamber b. In this connection, although the valve disk 47 closes immediately upon initiation of the "rebound above normal" phase of operation, the metering pin body 52 and the metering pin 54, which were moved upwardly with the valve disk 47 when the latter lifted during the "compression above normal" phase of operation, can return to their normal positions, even though urged by the spring 53, only as fast as liquid can enter the bore 43. Therefore, the return of the metering pin element 51 to its normal position is gradual and at a rate as determined by the strength of the spring 53 and the provision for flow of liquid to the bore 43. Thus, as the piston 11 moves upwardly, the effective area of the opening 50 initially is relatively small, due to the presence in said opening of a larger bottom portion of the metering pin 54, but increases with upward movement of the piston. This means, of course, that the flow of liquid from the chamber a to the chamber b initially is at a slow rate and is at an increasingly higher rate as upward movement of the piston progresses. Accordingly, rapid expansion of the vehicle spring when it is most highly energized is prevented and its more rapid expansion is permitted as its energy decreases.

The vehicle body thus is relieved of shock due to rebound of the vehicle spring.

Since, due to the presence of the piston rod 16 in the chamber a, not enough liquid is delivered from said chamber to the chamber b, to maintain the latter chamber filled with liquid as upward movement of the piston 11 takes place, the valve disk 33 rises and replenishing liquid for the chamber b flows from the bottom of the reservoir 26 through the ducts 36 to said chamber b.

The "rebound below normal" phase of operation of the shock absorber occurs whenever, for any reason, the piston moves from its normal position toward the head 13. During such movement, liquid flows from the chamber a through the openings 50 and 49 into the chamber b at a predetermined rate such as properly to check rebound of the vehicle spring if the rebound of said spring is at a normal rate. If, on the other hand, the rebound is exceptionally sudden, or if, for any reason, either of the openings 49 or 50 should become choked, the abnormally high pressure developed in the rebound chamber a will result in downward flexure of the spring disk 41 and unseating of the valve seat disk 44, with the consequence that liquid may flow from the chamber a around the disk 44 and through the openings 46 in said spring disk 41 to the chamber b. There is thus incorporated in the present shock absorber a safety feature which insures against the shock absorber being damaged in the event it is subjected to very sudden rebound actions or if, for any reason there should occur a stoppage in the openings 49 or 50.

Following the "rebound below normal" phase of operation there occurs the "compression below normal" phase of operation, or, in other words, return of the piston from an upper position within the cylinder 10 to its normal position therein. During this phase the operation is as set forth in connection with the "compression above normal" phase of operation.

Referring now particularly to Figs. 4 to 7 of the drawings, it will be observed that, aside from the fact that the metering pin 29ª extends through the rod 30ª and is exposed at the lower end of said rod for adjustment, the construction and operation of the parts at the bottom of the shock absorber is the same as illustrated and described in connection with the Fig. 1 embodiment of the invention. In this connection it is pointed out that the parts at the top of the shock absorber shown in Fig. 4 also may be the same as illustrated and described in connection with the Fig. 1 embodiment of the invention. Accordingly, the details of the top structure shown in Fig. 1 have not been repeated in Fig. 4. Moreover, the piston 11ª, valve seat disk 44ª and spring disk 45ª of the Fig. 4 embodiment of the invention are, or may be, the same as in the Fig. 1 embodiment of the invention. Accordingly, these parts will not again be described in detail. In short, the essential difference between the Figs. 1 and 4 constructions resides in the use in the latter construction of a metering valve 51ª differing in construction and mode of operation from the metering pin element 51 of the Fig. 1 construction, but performing the same functions as said metering pin element 51.

The metering valve 51ª is in the form of a hollow cylinder, open at its ends and slidably mounted in a bore 43ª in the lower end of the piston rod 16ª and having, intermediate its ends, a transverse partition 56, whereby its upper part constitutes a plunger operating within a dashpot comprised by the upper part of the bore 43ᵃ.

A disk valve 47ᵃ is urged constantly downward upon the top of the valve seat disk 44ᵃ, in covering relation to the openings 46ᵃ therein, by a coil spring 48ᵃ interposed between said valve disk and the top wall of the piston 11ᵃ, and rising from said valve disk 47ᵃ is a central tube 57 the top portion of which is disposed within the lower end portion of the bore 43ᵃ whereby the valve 47ᵃ is guided for vertical movement.

The metering valve 51ᵃ rests at its bottom upon the top of the tube 57 and said valve 51ᵃ is urged constantly downward by a coil spring 53ᵃ interposed between the top of said valve and the wall defining the top of the bore 43ᵃ.

In order to provide for universal movement of the valve disk 47ᵃ so that it may seat properly upon the valve seat disk 44ᵃ, the top of the tube 57 is provided with an annular, exterior, transversely convex bead 58 for cooperation with the wall defining the lower end portion of the bore 43ᵃ. Moreover, the bead 58 is of suitably smaller diameter than the bore 43ᵃ so that a predetermined small amount of liquid may flow into the lower end of the bore 43ᵃ, around said bead 58 and pass between the bottom and the top edges of the metering valve 51ᵃ and the tube 57, respectively, into and through said tube to the compression chamber b' below the piston 11ᵃ.

In the metering valve 51ᵃ are diametrically opposite ports 59 which have downwardly converging side walls, and in the piston rod 16ᵃ are diametrically opposite rectangular ports 60 with which the ports 59 cooperate. When the metering valve 51ᵃ is in its normal, lowermost position the tops of the ports 59 are disposed in alinement with or slightly below the bottoms of the ports 60, so that flow of liquid through said ports 59, 60 normally is prevented. When, however, the valve 51ᵃ rises in the bore 43ᵃ, the ports 59, 60 register and permit flow of liquid through said valve 51ᵃ and the tube 57 of the valve disk 47ᵃ between the cylinder chambers above and below the piston 11ᵃ. In this connection it is apparent that, as the valve 51ᵃ rises the effective area of the registering ports 59, 60 becomes a maximum when the tops of said ports become alined, and that, thereafter, the effective area of said ports progressively decreases due to the downward convergence of the walls defining the sides of the ports 59. It is also apparent that by rotatably adjusting the valve 51ᵃ to more or less vertically disaline its ports 59 from the ports 60, the actual effective area of the ports which results from rise of the valve 51ᵃ may be varied. In other words, by rotatably adjusting the valve 51ᵃ, the effective area of the ports 59, 60 for any given vertical position of the valve 51ᵃ may be varied. In this connection it will be observed that a rod 61 extends through a central bore in the piston rod 16ᵃ and at its lower end carries a cross pin 62 which is engaged in vertical slots 63 in the side walls of the valve 51ᵃ. Thus, said valve 51ᵃ is free to move vertically and is rotatably adjustable by rotation of the rod 61. The upper end of the rod 61 is exposed at the top of the piston rod 16ᵃ. Therefore, the valve 51ᵃ is rotatably adjustable at will without requiring disassembly of any part of the shock absorber.

The upper part of the valve 51ᵃ is made of slightly lesser cross-sectional area than the bore 43ᵃ, as for example by being grooved in the manner described in connection with the body portion 52 of the metering pin element 51 to permit liquid to flow into the upper end of the bore 43, and in this connection it will be observed that the valve 51ᵃ has an exterior, annular channel 64 and that the piston rod 16ᵃ has openings 65 providing communication between the chamber a' and said channel 64 in all operative vertical positions of the valve 51ᵃ for flow of liquid to and from the upper end of the bore 43ᵃ from and to the chamber a'.

As will be apparent from the foregoing, the ports 59 in conjunction with the ports 60 serve the same purpose in the Fig. 4 form of the invention as the metering pin 54 serves in the Fig. 1 form of the invention. It will further be apparent that, whereas the Fig. 1 form of the invention lacks provision for adjustment of the metering pin 54 to vary its operation, the Fig. 4 form of the invention embodies provision for adjustment of the equivalent liquid metering means to best suit the shock absorber for use in conjunction with any particular vehicle spring with which it may be associated. This is important due to the great variance in different vehicle springs and to the changes in resilience in individual vehicle springs which takes place with use and wear of such springs. In other words, the provision for adjustment of the metering pin 29ᵃ and the metering valve 51ᵃ from the exterior of the shock absorber, enables the latter to be suited for best operation with any given spring at any given time, with ease and facility.

When the piston 11ᵃ approaches the head 14ᵃ and the valve 47ᵃ is lifted, the valve 51ᵃ is forced upwardly and liquid flows from the chamber b' to the chamber a' through the ports 59, 60 as well as through the ports 46ᵃ and 42ᵃ. Upon reverse movement of the piston the valve 47ᵃ immediately closes, but the valve 51ᵃ moves downwardly at a rate regulated by the flow of liquid into the upper end of the bore 43ᵃ as heretofore explained in connection with the Fig. 1 form of the invention. Accordingly, the ports 59, 60 control the liquid flow in the same general manner as the metering pin 54 controls the liquid flow in the Fig. 1 form of the invention. Moreover, the loose fit of the upper end of the tube 57 with the lower end of the bore 43ᵃ in the Fig. 4 construction is for the same purpose as the recessing of the metering pin element 51 at 55 in the Fig. 1 construction.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a hydraulic shock absorber, a cylinder, a piston reciprocable therein, a head at one end of said cylinder, a piston rod extending from said piston through said head, and a packing ring of pliable material carried by said head and surrounding said piston rod and exposed at its outer side and bottom within the cylinder, said packing ring having a groove in its inner face extending from end to end thereof and designed to have its cross sectional area varied by compression of the packing ring by pressure of liquid within the cylinder.

2. In a hydraulic shock absorber, a cylinder, a piston reciprocable therein, a liquid reservoir, a head closing the lower end of said cylinder, said head having ducts affording communication between the lower end of said cylinder and the reservoir, said ducts opening through the top of said head, a flexible disk normally seated on the top of said head outwardly of said ducts, said disk having a central opening, a metering pin carried by said head and extending through said opening, said metering pin having portions of different diameters with which said opening cooperates by downward flexure of the central portion thereof, there being normally a space between said disk and the top of the head through which liquid passing from the cylinder through the central opening in said disk may pass to said ducts and into the reservoir.

3. In a hydraulic shock absorber, a cylinder, a piston reciprocable therein, a head closing the bottom of said cylinder, a metering pin rising from said head, the top of the head sloping downwardly and inwardly toward said metering pin, a liquid reservoir, said head having ducts affording communication between said reservoir and the lower end of said cylinder, said ducts opening through the said sloping top of said head, a flexible valve disk normally seated on top of said head outwardly of said ducts, spring means maintaining said valve disk normally seated, said disk having a central opening through which said metering pin extends, and said metering pin having a portion of reduced diameter disposed directly below said disk when the latter is seated and is in a normally unflexed condition.

4. The combination as set forth in claim 3 in which the metering pin is threaded in the head for vertical adjustment.

5. The combination as set forth in claim 3 in which the portion of the metering pin that is disposed in the opening in the valve disk when said disk is seated and is in its normally unflexed condition is of substantially the same diameter as said opening, and in which said portion of said metering pin and the portion thereof of reduced diameter are joined together by a downwardly tapering portion of the pin.

6. In a hydraulic shock absorber, a cylinder, a piston reciprocable therein, said piston being hollow and having a downwardly facing annular shoulder, a valve seat disk peripherally seated against said shoulder, a spring disk held at its periphery by the piston and having its central portion engaged with the central portion of said valve seat disk and maintaining the latter normally urged upwardly with its periphery seated against said shoulder, said valve seat disk and said spring disk having openings therein, and valve means cooperating with said valve seat disk to control flow of liquid through said piston.

7. In a hydraulic shock absorber, a cylinder, a piston reciprocable therein, said piston being hollow and having a downwardly facing annular shoulder and an inwardly opening annular groove below said shoulder, a valve seat disk marginally seated against said shoulder, a spring disk marginally engaged in said groove and centrally exerting upward pressure against said valve seat disk to maintain the latter normally seated marginally against said shoulder, said valve seat disk and said spring disk having central alined openings and other openings outwardly of said central openings, a valve disk normally spring urged downwardly upon said valve seat disk in covering relationship to the second mentioned openings therein, said valve disk having a central opening, and liquid metering means controlling flow of liquid through the central openings in said valve seat disk and said spring disk and said valve disk.

8. In a hydraulic shock absorber, a cylinder, a piston reciprocable therein, said piston having a hollow bottom portion and a top wall provided with openings affording communication between the cylinder space above the piston and the hollow bottom portion of the latter, a valve seat disk in the bottom hollow portion of said piston having a central opening and other openings around said central opening, a valve disk, spring means maintaining said valve disk normally urged downwardly against said valve seat disk in covering relationship to the second mentioned openings therein, said valve disk having a central opening, a tube rising from said valve disk in surrounding relationship to the central opening therein, a piston rod extending upwardly from said piston and having a bore in its lower end opening into the hollow bottom portion of the piston above the valve seat disk, the upper end of said tube fitting loosely in the lower end of said bore, the piston rod having a port above the top of the piston affording communication between the cylinder space above the piston and said bore, a hollow member vertically slidable in said bore and having a transverse partition, spring means constantly urging said member downwardly to a normal position in which its seats at its bottom on the top of the valve disk tube when the valve disk is seated, said hollow member having, below said partition, a downwardly tapering port, the top of which normally is disposed below the bottom of the piston rod port and which cooperates with said piston rod port upon upward movement of said hollow member to afford communication between the cylinder spaces above and below the piston.

9. The combination as set forth in claim 8 in which the hollow member is rotatably adjustable.

10. The combination as set forth in claim 8 in which the hollow member is rotatably adjustable and in which means for rotatably adjusting said member is accessible from the exterior of the shock absorber.

11. In a hydraulic shock absorber, a cylinder, a piston reciprocable therein, a liquid reservoir, a head closing the lower end of said cylinder, said head having ducts affording communication between the lower end of said cylinder and the reservoir, said ducts opening through the top of said head, a disk normally seated on the top of said head outwardly of said ducts, said disk having a central opening, a metering pin carried by said head and extending through said opening, said metering pin having portions of different diameters with which said opening cooperates by relative movement between said pin and disk to variably control flow of liquid between said reservoir and said cylinder, there being a space between said disk and the top of the head through which liquid passing from the cylinder through the central opening in said disk may pass to said ducts and into the reservoir.

NEVIN S. FOCHT.